Nov. 18, 1924.

Re. 15,946

M. L. MUELLER

METHOD AND APPARATUS FOR KILN DRYING

Original Filed July 20, 1921 3 Sheets-Sheet 1

Inventor

Moritz L. Mueller,

By H. L. & C. L. Reynolds

Attorney

Nov. 18, 1924.

M. L. MUELLER

Re. 15,946

METHOD AND APPARATUS FOR KILN DRYING

Original Filed July 20, 1921 3 Sheets-Sheet 2

Inventor

Moritz L. Mueller,

By H. S. & C. L. Reynolds

Attorneys

Nov. 18, 1924. Re. 15,946

M. L. MUELLER

METHOD AND APPARATUS FOR KILN DRYING

Original Filed July 20, 1921 3 Sheets-Sheet 3

Inventor
Moritz L. Mueller.

By H. L. & C. L. Reynolds

Attorneys

Reissued Nov. 18, 1924. Re. 15,946

UNITED STATES PATENT OFFICE.

MORITZ L. MUELLER, OF SEATTLE, WASHINGTON, ASSIGNOR TO NORTHWEST BLOWER KILN CO., OF SEATTLE, WASHINGTON, A CORPORATION OF WASHINGTON.

METHOD AND APPARATUS FOR KILN DRYING.

Original No. 1,437,385, dated November 28, 1922, Serial No. 486,282, filed July 20, 1921. Application for reissue filed August 12, 1924. Serial No. 731,677.

*To all whom it may concern:*

Be it known that I, MORITZ L. MUELLER, a citizen of the United States, residing at Seattle, in the county of King, State of Washington, have invented certain new and useful Improvements in Methods and Apparatus for Kiln Drying, of which the following is a specification.

My invention relates to dry kilns and the method of operating the same.

The object of my invention is to produce a kiln designed especially for drying lumber but capable of being used for drying other materials, and a method of operating such kilns, which apparatus and method are designed to be an improvement over the existing art.

The characteristic feature of the process consists in providing means whereby a positive circulation may be secured in the kiln and whereby a certain small percentage of the air after having passed through the kiln and absorbed moisture from the contents of the kiln, will be discharged from the circulation and its place taken by a like amount of air drawn from an outside source.

Another object of my invention is to provide an apparatus which is simple and cheap in its construction and whereby better and more even distribution and circulation of the air is secured throughout the contents of the kiln.

Other obejects of my invention may be seen from a study of the following specification and the accompanying drawings.

The features of my invention which I believe to be new and upon which I desire to secure a patent will be hereinafter disclosed and then particularly pointed out by the claims which terminate this specification.

The accompanying drawings show in a diagrammatic manner the apparatus and the manner of using the same which constitute my invention.

The accompanying drawings show a kiln 1 which is, or may be, in many respects of standard construction. The kiln chamber is shown as being constructed of such size and shape as to receive loaded cars or trucks of lumber for the purpose of drying the same. It is, therefore, provided with track rails 10 which extend through the kiln and upon which lumber piling trucks 11 are mounted to run.

Figures 1, 2:
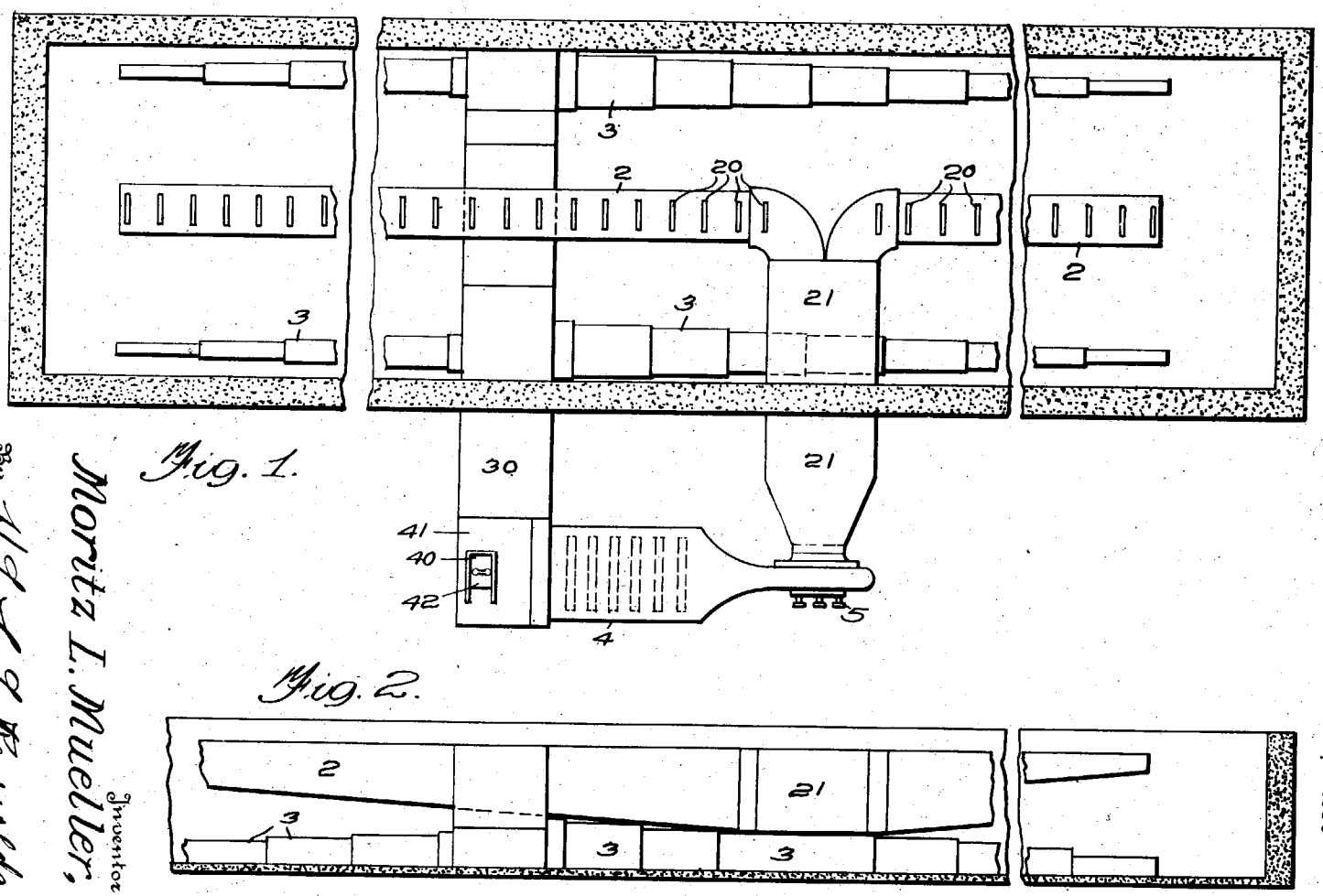
Figure 1 is a plan view of the air distribution system of the kiln, the walls of the kiln being shown in section.
Figure 2 is a longitudinal sectional elevation of that part of the kiln which contains the air distributing pipes.
Figure 3:
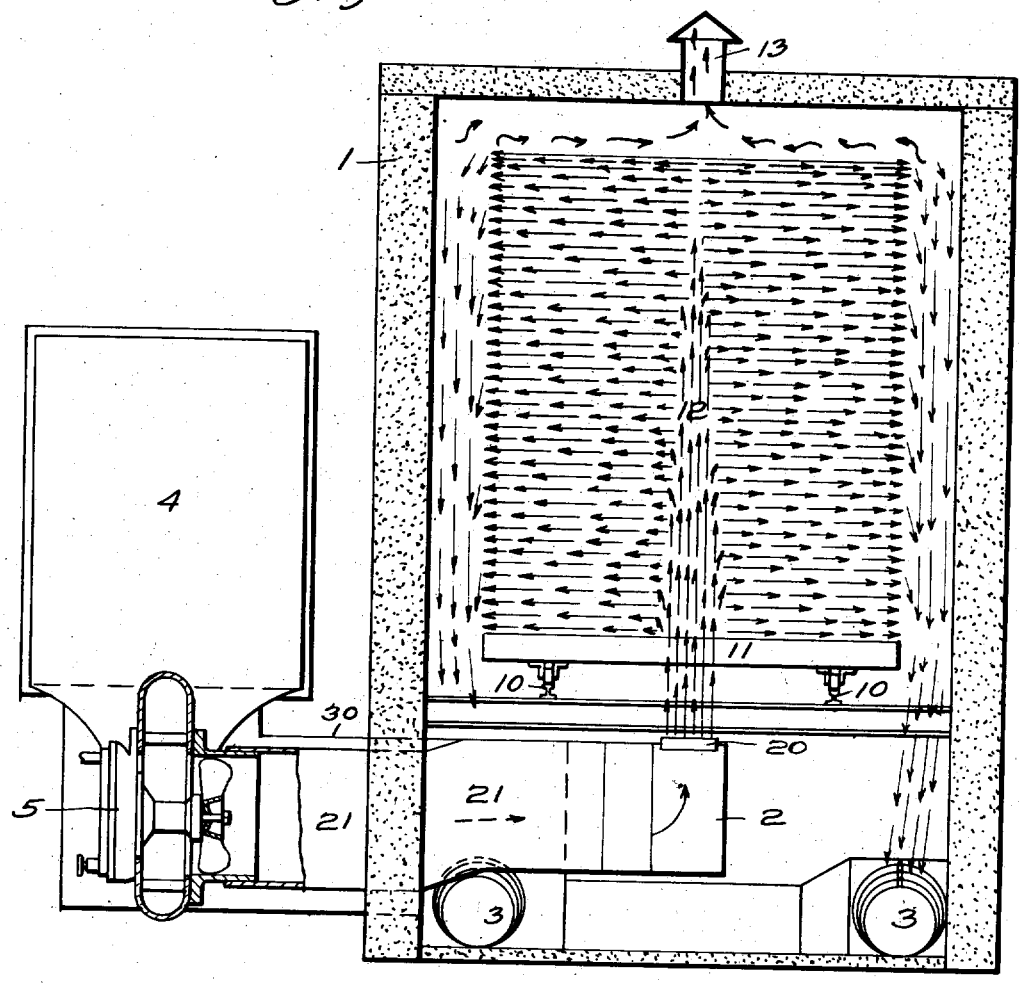
Figure 3 is a cross sectional view of a kiln having my invention installed therein, illustrating the location of the parts employed for producing a positive circulation.

In the device as shown in Figure 3 the lumber is shown as placed horizontally upon the trucks and provided centrally with an opening or chimney 12 which is wider at the bottom than at the top, said chimney preferably tapering from the bottom towards the top. It is to be understood that in forming the piles upon the trucks, cross strips are placed between the layers of lumber thus providing an air circulating passage at each side of each layer of lumber.

In a distributing system having the pipes located and used as is contemplated in Figure 3, the central pipe 2 is the air discharge pipe for the air which is discharged from the heater into the kiln for the purpose of drying the lumber or other product contained therein. The pipe 2 has a large number of discharge slots or holes 20 placed rather closely together and distributed along the length of the pipe. These are in the top wall of the pipe. In consequence, the air discharged through these openings 20 is discharged directly into the chimney 12 which has been formed at the center of the load of lumber on the trucks. The air passing up into this chimney passes therefrom laterally in opposite directions between the layers of boards and is discharged at the side of the pile of lumber, thence flowing downwardly at each side of the kiln and is drawn into the suction or discharge pipes 3 from which it is withdrawn to the heater.

The suction pipes 3 are shown as being round in cross section. The round section is however not an essential although it is a convenience on the score of ease and economy of manufacture. The pipe as a whole is made up of a number of units 30 which are progressively of somewhat smaller diameter as they are located farther away from the point at which said pipe is connected with the suction producing means. As shown in the drawings the connection with both the air supply and the suction pipe is at the center of the length of the kiln. It may, however, be made at any point which has been found suitable and is desirable.

While for purposes of explanation, I have illustrated the direction of the air currents by the arrows it is not to be understood that the air flow is in the clear cut and well defined paths designated by said arrows. Upon the contrary the central vertically directed jets of air act as injectors, drawing into themselves air from the main body of air within the kiln and more or less air from the return streams, until the whole body of air and water vapor within the kiln is in circulation. The result of this is that materially more air is circulated than is actually handled by the fan, whereby I am able to increase the volume of the drying medium with a minimum size and capacity blower or fan. This results in economy in first cost and in economy in power consumption. Furthermore the air drawn into the discharge stream has its temperature raised by contact and intermixture with such stream and thus the heater 4 exercises its effect upon a much larger volume of air than ever directly contacts with it. By creating the condition above set forth i. e. one wherein a drying medium of large volume is uniformly circulated throughout the whole area of the kiln it is assured that each and every part of the lumber being dried will be subjected to substantially the same drying influence, whereby uniformity in product, a most desirable result, is achieved.

The air discharge pipe 2 is made tapering or decreasing in depth from its main supply pipe 21 in either direction although preferably of uniform width. This pipe is shown as being of polygonal cross section, the same being indicated as a rectangle. The discharge openings 20 are all located in the top wall of the pipe. The suction pipes 3 are shown as being of round cross section. These are progressively smaller in diameter as they are removed from the point where said pipe is connected with the circulation producing mechanism. This reduction in size is shown as being secured by making the pipe up of a number of sections, which sections are progressively of smaller diameter. This difference in diameter is enough so that if the pipe sections be secured to each other along one side, there will be formed between the telescopic ends of the pipe a crescent shaped opening. Such openings are relied upon for passing air into the suction pipe 3.

Outside of the kiln is located a heater 4 and a fan 5 or any suitable means for producing a positive circulation of the air. The heater is connected with the air withdrawing or suction pipes 3 of the kiln by means of a flue 30. The fan 5 is connected with the air supply pipes 2 by means of flue 21. The heater and the fan are connected so that the fan draws its air supply from the heater and then forces it into the kiln.

The mechanism which is described constitutes one form of closed circulation system for dry kilns. It is not contemplated that this system be operated continuously as a perfectly closed system. I have found that if a small percentage of the air of the kiln be discharged or wasted after it has passed through the dry kiln, it will eventually carry off a very considerable amount of the moisture which has been extracted from the lumber by the heat. The amount of air thus discharged must, however, be replaced. This is done by admitting the required amount of air to the system, preferably at a point just prior to its entrance to the heater 4. For this purpose I have shown in the hood 41 which connects the heater with the suction flue 30, an opening which is normally covered by a slide, as 42. By properly adjusting the slide the opening may be varied in area or entirely closed.

The amount of air drawn into the system at this point should correspond with the amount of air withdrawn from the system at another point or points. By withdrawing a small amount of air and replacing this with air drawn from an outside source, excessive charging of the air in the kiln is prevented and heat units are conserved. I have found it sufficient to provide means for admitting a small amount of air to the heater. As there is a certain amount of suction at this point this may be done by providing any suitable type of opening which will communicate with the external air.

I have also found that in kilns of normal or usual construction there is sufficient leakage of air, if the pressure inside rises even a quite unappreciable amount, that it is unnecessary to provide special means for the discharge of a small amount of air from the kiln. For this reason I have not shown any special air discharging means except as the flue 13 serves for this purpose. Special discharge openings of any suitable type may be provided if this is thought desirable. As kilns are usually constructed natural leakage will be found sufficient.

Figure 4:
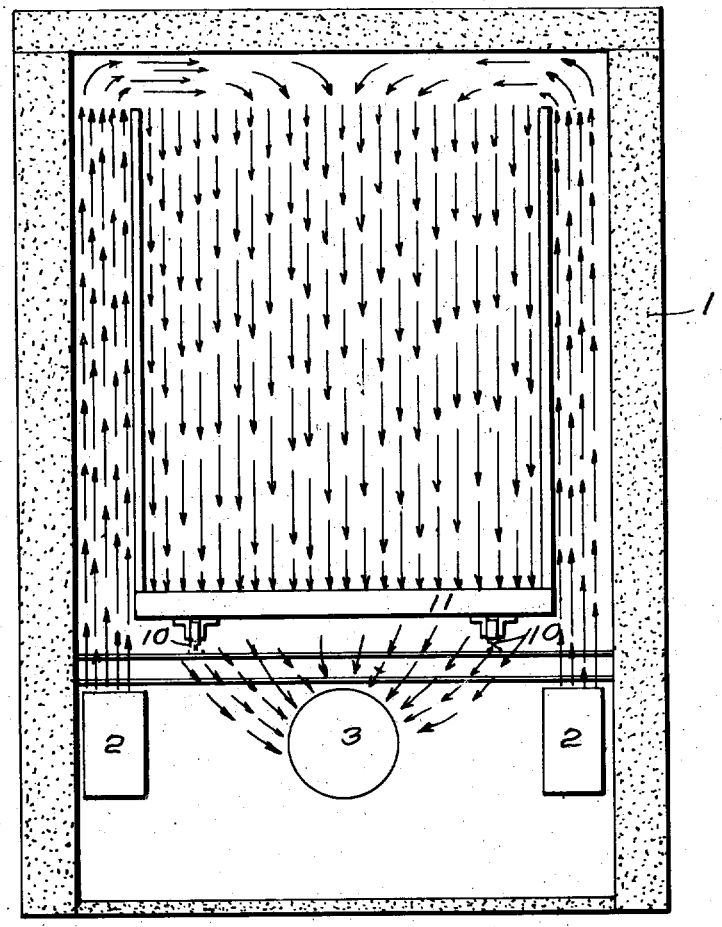
Figure 4 is a cross sectional view of a kiln of my construction in which the air distributing pipes are located in somewhat different relation and the manner of circulating the air through the lumber is also somewhat different.

In the kiln as illustrated in Figure 4 the lumber trucks are supposed to be loaded with lumber which has been piled on edge. In this case I prefer to reverse the locations of the air supply and discharge pipes. In this case I prefer to have the air supply pipe divided, one being placed at each side close against the wall of the kiln. The air suction pipe or that which is used to withdraw air from the kiln is in this case located centrally beneath the kiln. In such case as this the hot air discharged from the fan is blown upwardly into the passageways existing between the sides of the load and the side walls of the kiln. This air enters between the lumber at the top of the pile and is drawn downwardly and into the air discharge pipe 3. The position of these pipes may be shifted as is thought best for different methods of piling the lumber.

Experience has shown that the air distributing means employed secures a substantially uniform distribution of air throughout the length of the kiln. Also that by continuously withdrawing the lumber and replacing this with unsaturated air, the necessity for condensing the moisture is eliminated. This retains the heat in the air except for the small amount contained in the discharged air and thus produces economy in operation.

What I claim as my invention is:

1. In combination a kiln, a lumber car trackway therein, a discharge conduit centrally disposed beneath the trackway and having a plurality of openings in its upper side, said conduit being gradually reduced in height from an intermediate portion toward its opposite outer ends, suction conduits having a plurality of inlet openings disposed upon opposite sides of the trackway and gradually reduced in capacity from an intermediate portion toward their ends, a circulating fan and casing therefor, and conduits connecting one side of said fan casing to the suction conduits and the other side of said fan casing to the discharge conduit said suction units being composed of a plurality of successively smaller circular sections the joints of which are so loosely fitted as to permit the passage of air into said conduit at said joints.

2. The herein described improvement in the art of drying lumber in a kiln having a trackway extending longitudinally thereof and an air discharge conduit lying between the rails of the track and extending in substantial parallelism therewith, and provided with openings discharging air under pressure upwardly at a number of points in its length, which improvement consists of piling lumber upon trucks with the successive layers of lumber spaced from each other to leave a plurality of lateral air passages therebetween, said lumber being so piled as to leave a longitudinally elongated central flue in each pile of lumber which is constricted upwardly and substantially closed at the top to thereby cause air delivered into the lower part of said flue to pass through said lateral openings and introducing said trucks into said kiln upon the tracks so that air from the air discharge conduits will be delivered into the elongated flues of the piles of the lumber at whatever point upon the trackway they may be positioned.

3. The herein described improvement in the art of drying lumber which consists of disposing the lumber substantially horizontally in a kiln with the pieces thereof in spaced relation to leave a plurality of air passages therebetween and introducing air to and withdrawing air from said passages in such manner as to set up a circulation of air between a point in substantial central alinement with the pile of lumber and spaced points disposed outwardly of the first named point and in substantial alinement with the sides of the pile of lumber, the incoming air acting after the manner of an injector, drawing into itself air from the main body of air within the kiln and air from the return streams so that some of the air is recirculated before passing from the kiln and materially more air is set in motion than is discharged into the kiln.

In testimony whereof I hereunto affix my signature.

MORITZ L. MUELLER.